United States Patent [19]

Johnson, Jr. et al.

[11] Patent Number: 4,831,727

[45] Date of Patent: May 23, 1989

[54] METHOD AND APPARATUS FOR TERMINATING FLEXIBLE WIRES

[75] Inventors: Keith Johnson, Jr., Manheim; Joseph F. Stachura, Palmyra; Josita M. Wilson, Harrisburg, all of Pa.

[73] Assignee: AMP Incorporated, Harrisburg, Pa.

[21] Appl. No.: 155,187

[22] Filed: Feb. 16, 1988

[51] Int. Cl.[4] ........................ H01R 43/09; B23P 19/00

[52] U.S. Cl. ........................ 29/866; 29/566.3; 29/749; 29/861

[58] Field of Search ........................ 29/861, 749, 566.3, 29/865, 866

[56] References Cited

U.S. PATENT DOCUMENTS

| | | | |
|---|---|---|---|
| 4,272,879 | 6/1981 | Wigby et al. | 29/749 X |
| 4,288,918 | 9/1981 | Nijman . | |
| 4,335,497 | 6/1982 | Casey | 29/566.3 X |
| 4,351,110 | 9/1982 | Folk . | |
| 4,363,167 | 12/1982 | Boutcher et al. | 29/749 X |
| 4,370,806 | 2/1983 | Funcik et al. . | |
| 4,383,369 | 5/1983 | Casey | 29/861 X |
| 4,385,794 | 5/1983 | Lucius | 439/401 X |
| 4,435,035 | 3/1984 | Berry et al. . | |
| 4,441,251 | 4/1984 | Grubb | 29/749 X |
| 4,590,650 | 5/1986 | Brown et al. | 29/566.3 X |
| 4,682,400 | 7/1987 | Casey | 29/566.3 X |

FOREIGN PATENT DOCUMENTS

| | | | |
|---|---|---|---|
| 154387 | 9/1985 | European Pat. Off. | 29/749 |
| 50090 | 6/1985 | Japan . | |

OTHER PUBLICATIONS

AMPMODU MTE—85—773, AMP Publication, Mar. 1988.

*Primary Examiner*—P. W. Echols
*Assistant Examiner*—Carl J. Arbes
*Attorney, Agent, or Firm*—James M. Trygg; William B. Noll

[57] ABSTRACT

The present invention relates to a method and apparatus adapted to assist in making electrical wiring harnesses comprised of connectors (12) having passages (14) on given center-to-center spacing and containing terminals (20) terminated to flexible wires (40); the method and apparatus featuring providing tooling to effect wire shear and termination on the given spacing via a spring-loaded wire clamp and wire guide means associated with nesting die (50) and punch (54) tooling whereby the wires are sheared and terminated in a single stroke.

11 Claims, 2 Drawing Sheets

METHOD AND APPARATUS FOR TERMINATING FLEXIBLE WIRES

This invention relates to a method and apparatus for making electrical wiring harnesses wherein multiple, relatively small and flexible electrical wires are terminated to electrical terminals which are loaded into connector housings. The invention method embraces a series of ordered steps, and the invention apparatus embraces tooling to feed wire, shear such wire, and terminate the sheared ends of such wire into electrical terminals which are then inserted into plastic housings to form wiring harnesses.

BACKGROUND OF THE INVENTION

The present invention provides a method and apparatus for manufacturing electrical harnesses of the type widely used to interconnect electronic circuits, and particularly those types of circuits which are of relatively high density having contact points which are on close spacings. Electronic packages frequently employ contact points in the form of contact pins or posts in arrays spaced apart on centers such as 0.050 or 0.100 inches. To accommodate this density, connectors have been designed to mate directly on such centers through the use of plastic housings having passages mounting terminals on such centers. Typically, the terminals employed include a front-end having spring contact fingers adapted to engage the contact pins or posts and a rear end adapted to be terminated to electrical wire. Connectors may have numbers of terminals and wires ranging from a single terminal and wire up to as many as 30 terminals and wires carried in a common housing. The high density of such packaging virtually orders the use of very fine and flexible electrical wire. The term "small or fine" can be considered to embrace wire having an outer diameter that is on the order of between 0.025 and 0.075 inches. Typically, such wire is comprised of stranded copper conductors, frequently seven in number, covered over by an extruded sheath of insulating material such as polyvinyl chloride, polypropylene, or materials having similar characteristics. Such wire is made to be flexible so that it may be suitably bent or flexed in use or installation without breaking. This characteristic of being small and flexible makes such wire difficult to handle, particularly as regards a cut or sheared loose end which needs to be positioned and terminated for use in a harness.

In U.S. patent application Ser. No. 945,588 filed Dec. 23, 1986 and entitled "Apparatus and Method for Connectors of Varying Dimensions," a connector is disclosed having the characteristics of the aforementioned connector and utilized for the purpose discussed. The connector of the pending application is terminated by a mechanism which positions the connector and terminals relative to an operator who feeds the sheared and loose ends of the wire one at a time for termination. A suitable wire guide is employed to assist the operator in such activity. Experience with this operation and with the limits upon productivity implicit in the handling of small and fine flexible wires serves as a background to the present invention method and apparatus.

SUMMARY OF THE INVENTION

The invention here disclosed relates to a method and apparatus for making electrical harnesses comprised of connectors formed by the use of plastic housings containing passages into which electrical terminals are fitted, such terminals being terminated to electrical wires to form circuit pathways. In accordance with the present invention, electrical wires are fed to define appropriate lengths on the center-to-center spacing of the connector passages in a position proximate to, but overlying, terminals which are mounted on a die nest on such spacing with wire feed being done in multiple rather than one at a time. A tooling punch including a wire shearing surfaces, wire guides which are spring-loaded to be collapsible, is provided to effect wire-shearing, stuffing and termination. A wire clamping mechanism is provided which is spring loaded to be displaced as wires are carried downwardly into terminals in the die nest to assist in wire alignment. In the invention method, wire is first fed to appropriate lengths and thereafter, tool closure is -affected to first clamp the wires proximate to the tooling with a wire-guiding means loosely captivating the wires above the terminals mounted in a die nest. Thereafter, with punch and die closure, the wires are severed between the edge surfaces of the wire feeding means and the punch means and displaced downwardly with each wire being inserted in an appropriate terminal. Additionally, in accordance with the invention, portions of the tooling punch are provided with surfaces intended to crimp portions of the terminal downwardly to both provide wire retention and for other purposes to be described. The foregoing is made to occur in one stroke by the relative closure of tooling with terminals and wires positioned on the same center-to-center spacing as the connector. In this manner, multiple wires are terminated for a given connector simultaneously with the wires being essentially captivated prior to, during, and after shearing and termination. The severed wire ends are thus not permitted to become loose to require dexterity of an operator and loss of productivity in harness-making.

DETAILED DESCRIPTION OF THE INVENTION

Figure 2:
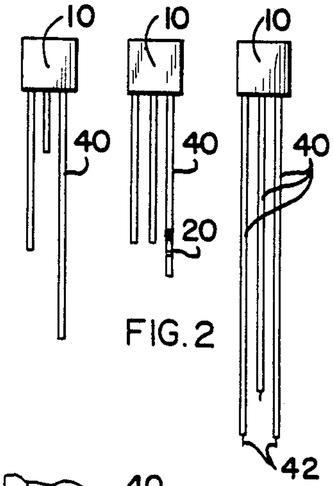
FIG. 2 is a plan view showing three harness elements wherein wires of various lengths are terminated to connectors in accordance with the invention concept.

Referring first to FIG. 2, there is shown three electrical harness units, each comprised of a connector housing 10 containing electrical terminals of a type to be described hereinafter suitably terminated to electrical wires 40. The wires 40 are typically quite small, being on the order of 0.035 thousands of an inch in diameter and may, as indicated in FIG. 2, be stripped at one end with a center conductive core 42 extending therefrom, or left unstripped or terminated as by a terminal 20. The length of the wires and the treatment of the free end thereof is dependent upon the particular application relative to further interconnection of the wires which may be through a variety of means including soldering, termination by traditional crimping or insulation displacement connector techniques (IDC) or the like. Relative to the connector shown in the aforementioned application Ser. No. 945,588, the wires for the connectors 10 were terminated one at a time by an operator manually positioning the free end of a pre-cut wire above a terminal and within the range of closure of tooling adapted to stuff such wire within the IDC structure of a terminal.

Figure 1A:
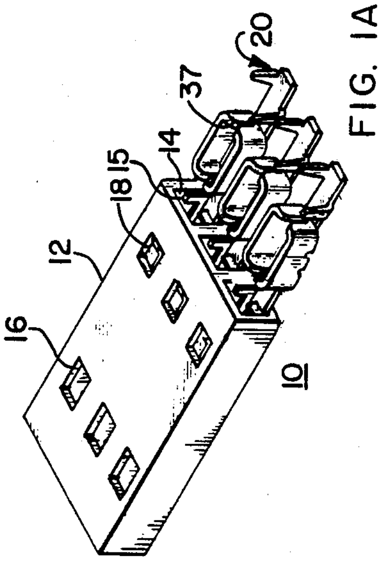
FIG. 1A is a perspective of a connector prior to termination and with the terminals thereof projecting therefrom preparatory to use.
Figure 1B:
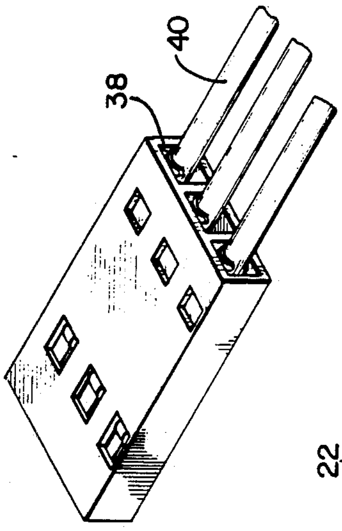
FIG. 1B is a perspective of the connector of FIG. 1 having the terminals thereof terminated to wires and inserted in the connector.
Figure 1C:
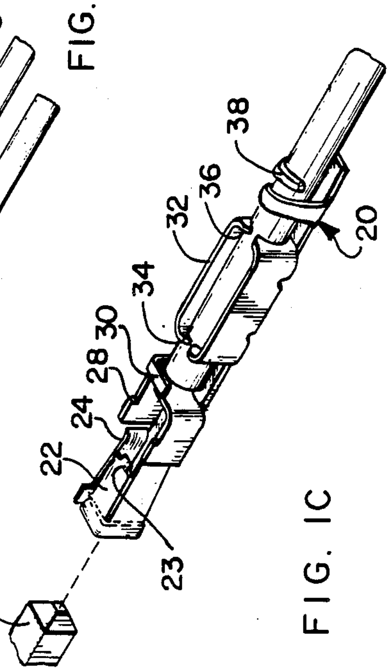
FIG. 1C is a perspective showing the end of a contact post aligned for engagement with an electrical terminal shown terminated to a wire.

FIGS. 1A–1C depict the connector 10, terminals 20 and wires 40 in greater detail and to a scale roughly twice the actual size with respect to the elements of FIGS. 1A and 1B a scale roughly four times the actual size with respect to the terminal 20 shown in FIG. 1C. Each connector 10 includes a housing 12 molded of a suitable engineering plastic having appropriate insulating and dielectric qualities. Housings 12 are typically manufactured in sizes to accommodate multiple terminals, the example shown in FIGS. 1A and 1B revealing an illustrative embodiment containing three terminals. As is mentioned in the aforementioned Application Ser. No. 945,588, connector housings may be individually molded to accommodate two, four, six, eight, or as many as thirty terminals in separate passages. The passages referred to are shown as 14 in FIGS. 1A and 1B are made to extend through the housings 12 allowing the terminals shown as 20 to be inserted fully within the housings as indicated in FIG. 1B. The housings 12 in the illustrative embodiment include additionally apertures shown as 16 and 18 in the side walls of the housings which are employed for indexing the housings within application tooling and additionally serve the purpose of allowing the terminals 20 to be latched first in a partially inserted position as indicated in FIG. 1A and secondly, in a fully inserted position as indicated in FIG. 1B. As shown in FIG. 1C, the terminals 20 each include a latch structure 22 formed of the metal of which the terminal is manufactured, the end 23 of which operates within the housing to engage the surfaces of the apertures 16 and 18 to retain the terminals within the passages of housing 12. Each of the terminals includes at least one contact spring element shown as 24 in FIG. 1C which serves to effect an electrical contact with a post 26, the end of which is shown in FIG. 1C. The post 26 is typically formed of a conductive material such as brass, suitably plated for the intended use with respect to the voltages and currents employed by an electronic circuit. The posts 26 are typically mounted in printed circuit boards interconnected to printed circuit paths as by solder and made to project therefrom on predetermined center-to-center spacings; spacings such as 0.100 inches being typical. Such posts, or alternatively, pins, are typically beveled as shown in FIG. 1C or rounded to facilitate entry into the contact area of terminals 20.

With respect to the terminals shown in FIG. 1C, there is further included portions of the terminal shown as 28 which fit within the passages 14 to stabilize the terminal in a radial sense within such passage. The terminal 20 also includes a metallic tab 30 struck from the material from which the terminal is formed which serves the function of limiting insertion of the terminal 20 within the passage 14 by engaging the rear surface of the housing as at 15, the end surface 23 of latch 22 as mentioned engaging the rear surface of aperture 18 to limit withdrawal of the terminal from the passage. Each of the terminals 20 includes as is shown in FIG. 1C, an IDC termination structure including slots shown as 34 and 36 which are dimensioned to effect a termination with the conductive strands of the wires 40 upon insertion of the wires into the terminal structure. The slots 34 and 36 are formed by the edges of the metal from which the terminal is made and are held relatively rigid in accordance with IDC concepts. Each of the slots 34 and 36 is tapered as at 37 in the manner shown in FIGS. 1A and FIG. 4 to provide a funneled entry guiding the wires toward the center of the slots and aiding in the stripping of the insulated coating of the wire also in accordance with IDC concepts. At the end of each terminal there is provided a pair of projections shown as 38 which serve as wire retention when deformed from the position indicated in FIG. 1A to the position depicted in FIG. 1C.

The connector 10 serves to provide a connect and disconnect function between circuit elements connected to the opposite ends of the wires as shown in FIGS. 1B and 1C through the terminals 20 and contact elements 24 to posts such as 26. In an actual embodiment, the passages 14 and therefore the terminals 20 are provided on center-to-center spacings dictated by the center-to-center spacings of post 26; typically 0.100 inches apart. Reference is made to U.S. Pat. No. 4,435,035 for teaching as to the terminals of the type shown in the present application. Relative to the method and apparatus of the invention, connectors like 10 are provided with multiple passages and terminals for use with multiple wires to form electrical harness units. These harness units can appear in forms like that shown in FIG. 2 as heretofore mentioned.

Figure 3:
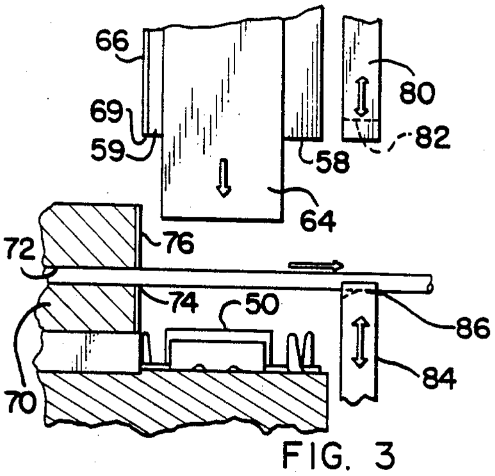
FIG. 3 is an elevation in partial section showing an electrical terminal, a wire being fed thereover, and the punch portion of the tooling of the invention preparatory to closure.
Figure 4:
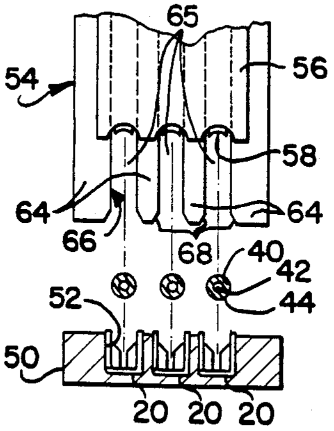
FIG. 4 is an elevation of the tooling of the invention viewed from the right side of the view of FIG. 3, in conjunction with wires preparatory to termination thereof.

Turning now to FIG. 3, a terminal 20 can be seen to be positioned beneath a wire 40 and tooling utilized to sever said such wire and place it within the terminal 20. In FIG. 4, the relative positioning and details of the elements can be visualized in a version adapted to terminate three wires and three terminals simultaneously. The wires 40 may be seen to include a center core 42 surrounded by an insulating jacket 44. Typically these wires are made up of fine strands of copper twisted together and frequently tin plated.

Figure 5:
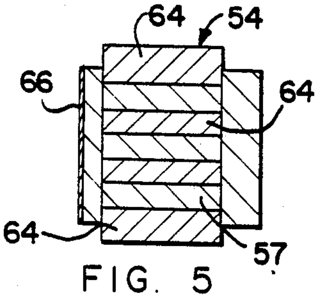
FIG. 5 is a section taken through the lines 5—5 in FIG. 3 revealing details of the punch portion of the tooling of the invention.

In accordance with the invention method and tooling concept, the terminals 20, the rear portions thereof, are positioned and held in a die nest 50 having suitable channels 52 each of a width and depth to align and hold the terminals 20 in a pattern of center-to-center spacing identical to that spacing of the passages 14 in the connector housing. It is to be understood that die nests like 50 may be provided with as many channels 52 as there are terminals in a given connector, such as 4, 8, or as many as 30. The various terminals 20 are loaded into the die nest by manipulating a connector in the condition shown in FIG. 1A, having the terminals projecting from the connector housing. A die nest 50 may be considered to be movable to a position clear of the wire and tooling for loading purposes and driven to the relative position shown in FIGS. 3 and 4 by suitable means. It is contemplated that the feeding of terminals into the die nest may be done by an operator or automatically by appropriate machinery. In practice, the die nest 50 is held relatively fixed in a horizontal and vertical sense with respect to the tooling thereabove which is made to displace downwardly loading the wires into the terminals 20. Such tooling is shown in FIGS. 3 and 4 to include a punch assembly 54 comprised of a punch 56 having wire stuffing projections 57 and, at the ends thereof rounded or curved crimping surfaces 58. The punch assembly 54 may be seen in FIGS. 3, 4, and 5 to include a wire guide structure comprised of blades 64 which define a series of channels or grooves 65 and serve the function of guiding wires 40 into engagement with appropriate portions of the terminals 20. As can be discerned from FIG. 4, the blades 64 are beveled at the ends as at 68 to provide a funneling or guiding effect as the wire guides are closed upon the wires.

Referring now to FIG. 3, the punch 56 may be seen to have a further beveled surface 59 in addition to the surface 58; these surfaces serving to deform, or crimp, portions of the terminal 20. The beveled surface 58 operates to effect the crimping of the wire retention elements 38 in a manner as shown in FIG. 1*c* causing such elements to wrap around and tightly embrace the wire 40 and provide wire retention. The beveled surface 59 serves to deform the element 30 downwardly freeing terminal 20 for insertion into a passage 14 following wire loading and termination. Proximate to the end of the punch 56, adjacent the beveled surface 59 as shown in FIG. 3 is a blade 66 which includes an edge surface 68 which forms a part of a wire shearing mechanism in the tool. The blade 66 can be suitably attached to and removed from the punch 56 for the purpose of maintaining an appropriate edge surface for wire shear.

Figure 6:
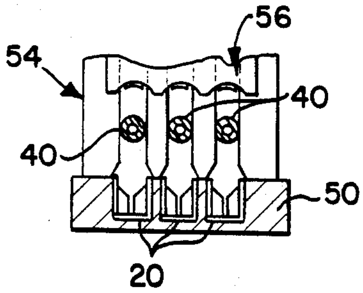
FIG. 6 shows the tooling of FIG. 4 partially closed.

The punch assembly 54, comprised of the punch 56 and the guide blade structure 64, is made relatively movable to be driven downwardly with respect to FIGS. 3 and 4 so that the punch engages the die nest 50. To effect this movement, a suitable ram must be provided, not shown and in conjunction therewith suitable guide structure to orient and align the positions of both the die nest 50 and the punch assembly 54. The punch 56 and the wire guide structure formed by blades 64 are in turn relatively movable, the blades being spring-loaded by means not shown initially to extend in the position shown in FIG. 4, but to effectively collapse relative to punch 56 as the tooling mechanism is driven into engagement. Thus it is that the blades 64 will retract in closure with the upper surface of die nest 50 to a position as shown in FIG. 6 allowing the punch 56, the wire stuffing projections 57 and the crimping surfaces 58 and 59 to operate.

As shown in FIG. 3, there is additionally included a wire feed guide 70 having apertures as at 72 to receive and guide wires 40. The wire guide 70 includes a thin blade shown as 76 apertured to define an edge surface 74 which is suitably sharpened and hardened to provide wire shearing in conjunction with the edge surface 68 attached to the punch tooling. Not shown but contemplated as part of the functioning apparatus would be the sources of wire such as barrels or reels and a wire feed mechanism operable to feed wires 40 in multiple through the wire feed 70 and along an axial path overlying terminals 20 and on the critical center-to-center spacings heretofore discussed. A variety of electronic wire feed mechanisms are available commercially for this purpose and such may be controlled electronically to pay out and measure the appropriate wire lengths called for by the harness definition.

Additionally provided and shown in FIG. 3 is a wire clamp mechanism comprised of an upper clamp element 80 typically relieved in a V- or U-shaped surface 82 which tends to center the wire and, opposed by a blade 84 relieved as at 86. The blade 84 of the clamp mechanism is spring-loaded to operate as will be hereinafter described.

Figure 7:
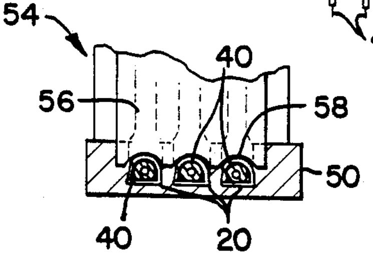
FIG. 7 shows the tooling of FIG. 4 fully closed to shear the wires and terminate such into the terminals.

Turning now to the operation of the method of the invention and to the apparatus heretofore described, a given cycle begins with the punch and die mechanism being in an open position, as in FIGS. 3 and 4, with the wire feed being actuated. Wire is accordingly fed from left to right with respect to the drawing FIG. 3, the several wire feeds being activated to measure an appropriate wire length for the given harness definition desired. Thereafter the clamping tooling 80–84 is driven relatively together to clamp the individual wires in the position shown in FIG. 3 and as part of that cycle, the punch assembly 54 is driven downwardly. At this point, the blades 64 of the collapsible wire guide effectively gather the wires into the channels 65 thus confining such wires from radial displacement and in essence captivating such wires and centering them on the aforementioned center-to-center spacings of which connector housing and terminals employ. As the punch assembly 54 moves downwardly, edges 68 and 74 close to sever wires 40. FIG. 6 shows the punch assembly 54 displaced downwardly to a point wherein the blades have gathered wires 40 and have begun to collapse against spring pressure relative to punch 56 bearing against die nest 50. The punch is then driven downwardly to the position shown in FIG. 7 wherein the projecting wire stuffing portions 57 of the punch insert the wires within the IDC terminal portions 32 of terminals 20 and the surfaces 58 and 59 effect metal deformation of the elements 30 and 38 to the relative position shown in FIG. 1C.

As the punch is driven into engagement with the die nest 50 and the edge surfaces 68 and 74 operate to shear the wires 40 and free such wire for downward displacement for termination, the spring-loaded wire clamp 84 accordingly retracts downwardly, thus holding the end of the wire against either axial or radial displacement during the stuffing operation.

As can be discerned, the method in the invention embraces first an appropriate feeding of lengths of wire followed by a clamping of the wire and closure of tooling to shear the trailing ends of the wires in multiple and carry such ends downwardly stuffing portions thereof into an IDC terminal. The IDC terminal is self-stripping and operates to electrically terminate the strands of the wire to the terminal and at the same time, portions of the terminal are deformed or crimped to effect wire retention and other functions. Thereafter the tooling is opened, the terminated connector displaced from the punch and die assembly and the terminals displaced inwardly of the housing such that the latch edges 23 engage the edge surfaces of aperture 16 in housings 12 locking the terminals as terminated with their respective wires into such housings. The harness unit assembly is thereafter removed for inventory and use and the cycle may be repeated.

Not shown but contemplated is the fact that the punch an die nest structure is held in precise relationship by suitable surrounding tooling such as a bolster allowing the relative reciprocating movement described and fixturing such tooling relative to the wire feed and to the connecting terminal location.

While the invention method and apparatus has been shown relative to a specific terminal of the IDC type having crimped wire retention, it is contemplated that both the method and the apparatus may be employed with suitable changes and adaptation to other terminals including those where an insulation piercing takes place assuming only that the forces involved relative to the punch and die structures are not excessive considering the relatively thin wall sections necessary to maintain the tight center-to-center spacing heretofore discussed. With respect to the tooling, those skilled in the tool and die arts who recognize the need for appropriate choices for materials and harnesses of the pieces along with appropriate mounting, jigging, and lubrication. Having now described the invention method and apparatus in a manner intended to enable its preferred practice by those skilled in the art, we append the attached claims:

We claim:

1. A method for making electrical harnesses characterized by the termination of multiple electrical conductive wires into electrical terminals in turn inserted into passages within a plastic connector housing, such passages being positioned on given center-to-center spacing comprising the steps:

a. providing a plurality of conductor wires, one for each connector passage,
b. feeding said wires in parallel on said given spacing,
c. positioning terminals on such spacing proximate to said wires and parallel thereto,
d. establishing a confining pathway extending from said wires to said terminals, then;
e. driving in a single stroke said wires against a shearing edge to shear said wires and further, driving said sheared wires along said confining pathway and inserting the sheared wires into said terminals on said spacing, and
f. inserting said terminals as terminated to said wires within the said housing.

2. The method of claim 1 further characterized in that each said terminal includes crimpable elements and there is provided an additional step of deforming said crimpable elements about each of said wires to effect wire retention for said connectors.

3. The method of claim 1 further characterized in that each said terminal has a forward contact end and a rear termination end and the said step of feeding said wire is in a direction from the said forward end toward the rear end axially along the length of said terminal.

4. The method of claim 1 wherein said establishing a confining pathway of step d includes loosely captivating said wires against radial displacement during said driving stroke by inserting guide blades between said wires and extending said guide blades from said wires to said terminals.

5. An apparatus for harness-making wherein each harness is comprised of a connector housing having a plurality of passages on given center-to-center spacings with electrical terminals mounted therein and terminated to flexible electrical wires said apparatus including wire feed means having a series of apertures positioned on said given spacing with each said aperture including a wire shearing edge, a die nest having a series of grooves positioned on said given spacing adapted to receive a series of terminals, said nest being positioned beneath the said wire feed means and aligned so that wire fed therethrough passes over the said terminals, punch means including for each said terminal a wire-stuffing punch substantially to said terminals and a wire-shearing edge and wire guide means extending on both sides of said punch with the said wire guide means being collapsible relative to the said punch to captivate the said wires during movement of said punch, punch driving means including means to drive the said punch downwardly to engage said die nest whereby to capture said wire in a radial sense with the said edges of said punch and wire feeding means shearing the said wires with said punch carrying said wires and inserting in terminating same in said terminal all of said given spacing.

6. The apparatus of claim 5 wherein there is included as part of said tooling a spring-loaded wire clamp positioned to clamp a given wire axially while being displaceable radially with said tooling in the closure thereof.

7. The apparatus of claim 5 wherein the said wire guide means is comprised of blades projecting on both sides of a given wire punch with means to spring bias said guide means to permit relative movement during closure of the punch means and the die nest means.

8. The apparatus of claim 5 wherein the said punch means includes surfaces adapted to engage portions of a given terminal in effective displacement thereof to provide wire retention for each said terminal.

9. The apparatus in claim 5 wherein the said punch means includes a first and second crimping surfaces spaced apart and adapted to engage portions of a given terminal to effect the displacement of said portions upon closure of the die nest and punch means.

10. In a tool for terminating flexible conductive wires into electrical terminals for use in a connector housing, the combination comprising a die nest adapted to receive a terminal in a channel and hold said terminal relatively fixed against displacement, a tool punch including punch means to drive a given wire into a given terminal for termination thereto, wire guide means on each side of a given punch means and spring means biasing said wire guide means downwardly to project from said punch means to said die rest whereby, upon closure of said punch and die guide means, a given said wire is loosely captivated and aligned for insertion in a terminal, each said punch means further including a wire shearing edge and there being including further wire shearing edge whereupon closure of said die nest and punch means effectively shears a given wire to be inserted in a terminal, while said wire is captivated.

11. The tool of claim 10 wherein there is a multiple of die nests of tool punches mounted on center-to-center spacings identical to the spacing of cavities in said connector housing.

* * * * *